(No Model.)

3 Sheets—Sheet 1.

F. M. LYTE.
PROCESS OF ELECTROLYTICALLY DECOMPOSING FUSED METALLIC CHLORIDES.

No. 510,276.

Patented Dec. 5, 1893.

WITNESSES.

INVENTOR:

ATTORNEYS (No Model.)　　　　　　　　　　　　　　　　3 Sheets—Sheet 2.
F. M. LYTE.
PROCESS OF ELECTROLYTICALLY DECOMPOSING FUSED METALLIC CHLORIDES.

No. 510,276.　　　　　　　　　　　　Patented Dec. 5, 1893.

WITNESSES.　　　　　　　　　　　　　　　INVENTOR:

(No Model.) 3 Sheets—Sheet 3.
F. M. LYTE.
PROCESS OF ELECTROLYTICALLY DECOMPOSING FUSED METALLIC CHLORIDES.
No. 510,276. Patented Dec. 5, 1893.
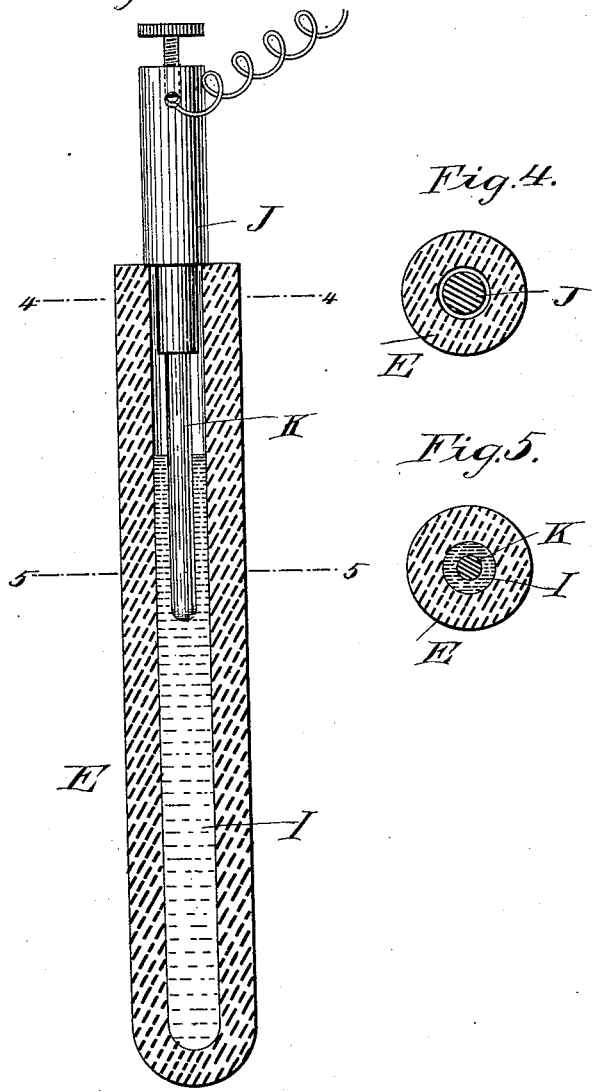
WITNESSES.
C. Sedgwick
Edgar Tate
INVENTOR:
F. M. Lyte
BY Munn & Co
ATTORNEYS

UNITED STATES PATENT OFFICE.

FARNHAM MAXWELL LYTE, OF LONDON, ENGLAND.

PROCESS OF ELECTROLYTICALLY DECOMPOSING FUSED METALLIC CHLORIDES.

SPECIFICATION forming part of Letters Patent No. 510,276, dated December 5, 1893.

Application filed June 30, 1893. Serial No. 479,255. (No specimens.)

*To all whom it may concern:*

Be it known that I, FARNHAM MAXWELL LYTE, analytical chemist, of 60 Finborough Road, London, S. W., England, have invented a new and useful Improved Process of Electrolytically Decomposing Fused Metallic Chlorides, of which the following is a full, clear, and exact description.

My invention relates to the electrolytical decomposition of metallic chlorides severally or in admixture, while in a state of fusion, and it consists essentially in effecting the decomposition within an open-mouthed bell-like chamber, which is sealed by dipping into molten metal corresponding to the base of the chloride under treatment and resulting, for the most part, from the decomposition of the said chloride. The object of performing the operation in a vessel so sealed is to prevent the escape of chlorine and permit of running off the metal as fast as it is reduced, and, on the one hand, to relieve that part of the apparatus with which the fused chloride and the chlorine generated come into contact from all strain due to the weight of the fused chloride and molten metal and, on the other hand, to entirely isolate the vessel which supports the weight of the whole contents of the cell, from contact with the chloride or chlorine generated, so that while the former vessel need only be made of a material able to resist attack by chlorine and withstand heat without regard to strength, the material of which the latter vessel is made need only possess the necessary strength and conductivity for heat without regard to any effect consequent on chemical action.

I will describe the invention as applied to the decomposition of lead chloride when in a state of fusion, into metallic lead and chlorine, and with reference to the accompanying drawings, forming part of this specification, wherein—

Figure 1:
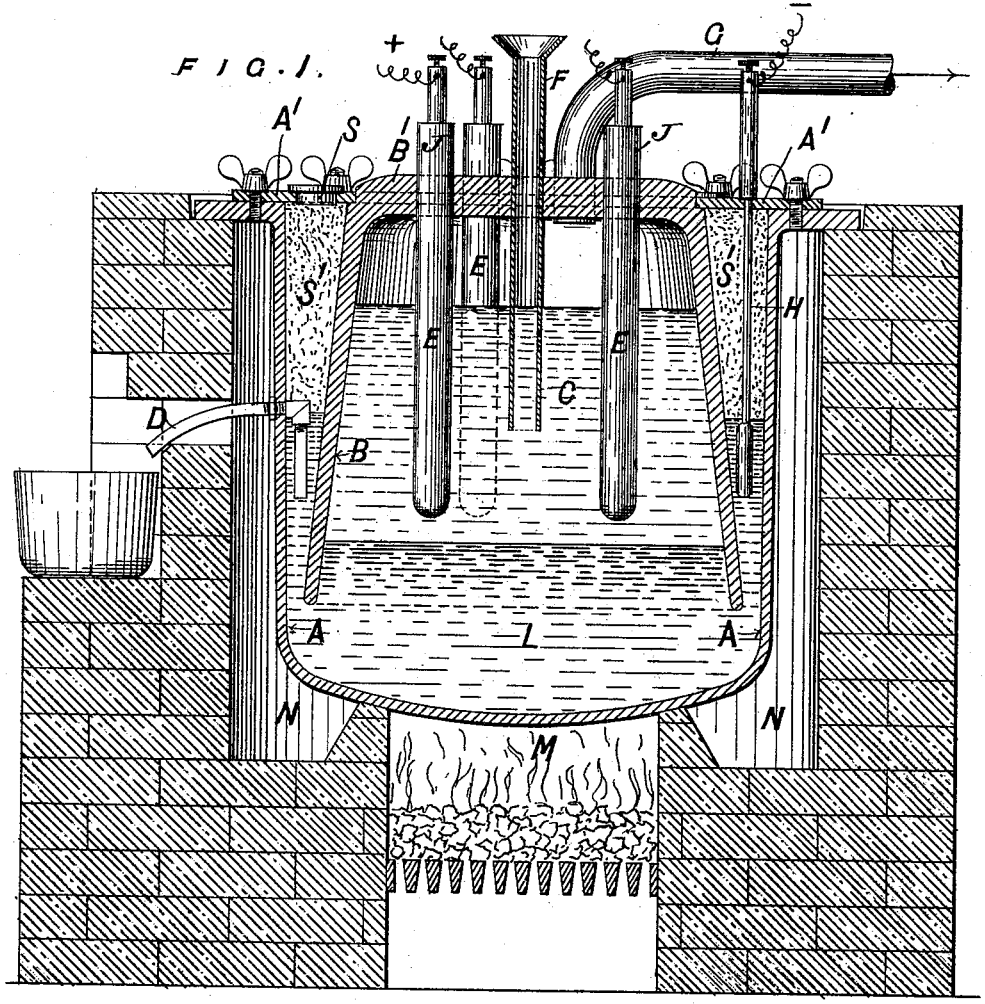
Figure 2:
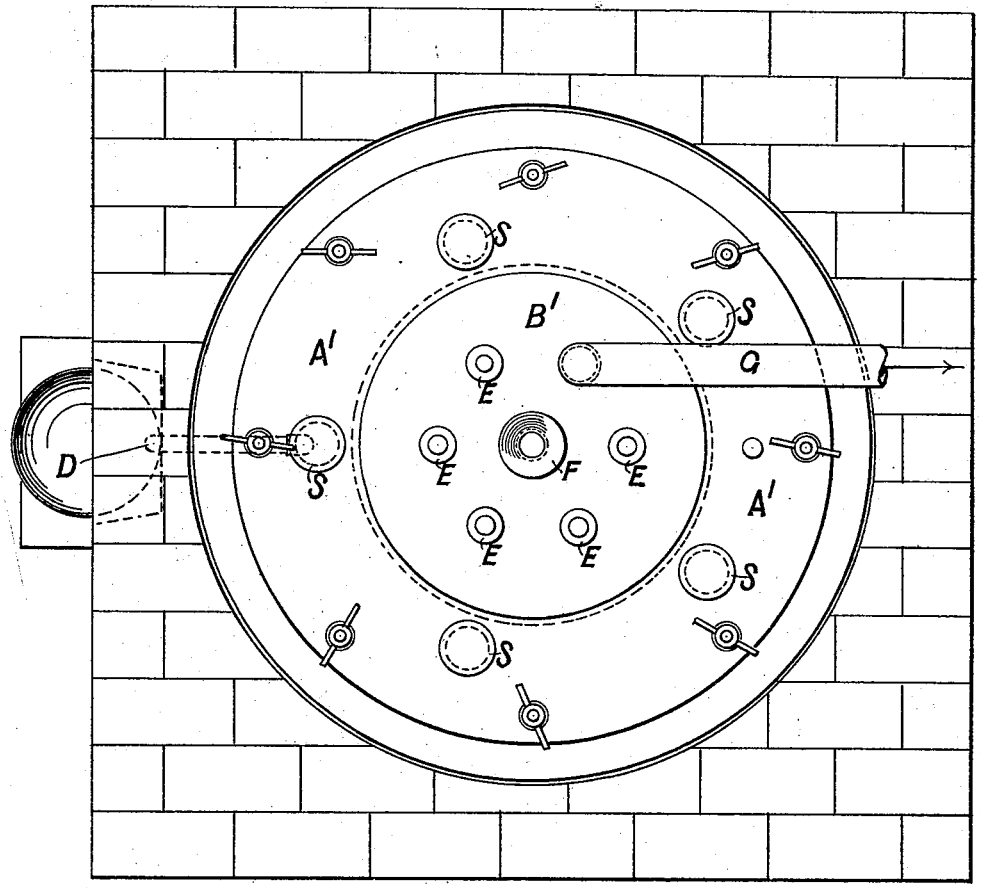

Figure 1 is a central vertical section; Fig. 2 a plan of the apparatus employed in carrying the process into effect. Fig. 3 is a sectional elevation of a tubular anode that may be employed in my invention; and Figs. 4 and 5 are cross sections of the same on lines 4—4 and 5—5 of Fig. 3, respectively.

A, is the containing vessel or pan and B, is the bell-chamber in which the electrolytic decomposition is effected, the open mouth of this vessel being sealed by dipping into molten lead L. The vessel B is partly filled with lead chloride C, leaving a space above for the collection of the chlorine generated, the pressure due to the height of the column of chloride causing a difference of level of the lead, sufficient to raise the lead outside the bell chamber to the bend of an overflow pipe D, with which the pan or container A is furnished.

E are anodes of carbon passing through the crown of the bell chamber B and immersed in the chloride C to within a short distance of the subjacent lead L which forms the cathode of the electrolytic decomposition cell.

F is an open pipe also passing through the crown of the bell for supplying chloride to the cell B, the said pipe being sealed by dipping into the chloride C so as to prevent the escape of chlorine.

G is a pipe leading through the crown of the bell for the outlet of the chlorine generated.

The pan A is set in brickwork or otherwise supported so as to be exposed at bottom and sides to the direct heat of a suitable gas or other furnace M, in connection with return flues N, whereby the lead L and chloride C are maintained in a state of fusion. The bell chamber is maintained in position in the pan A by the cover A' of the said pan which has an aperture in which the upper part B' of the bell B fits, as shown, the cover being bolted or otherwise fixed in place and provided with hand holes S at which the space S' around the bell B at the upper part of the pan is filled up with powdered charcoal, sand or equivalent material, which resting on the surface of the lead outside of the bell prevents access of air to, and consequent oxidation of, the lead and which also prevents loss of heat by radiation. As the bell chamber B has only to withstand the pressure due to the head of fused chloride, no great strength is required and it may be made of any sufficiently refractory material not liable to attack by chlorine, preferably earthenware or plumbago, gas tight joints being made between it and the anodes and pipes passing through it by means of asbestus-string or ground asbestus and silicate of soda, or other suitable cement, the anodes being insulated from it if it be made of plumbago or other electrically conductive material. The pan A needs no protection from attack since it is not exposed to contact by the chlorine. It may therefore be made of cast or wrought iron and electrical connection may be made with the cathode of molten lead L either by a tinned iron rod H immersed in the lead, or by the pan A itself if it be tinned internally to insure good electrical contact with the lead. The overflow pipe D dips down within the pan, as shown, to avoid choking with sand.

The anodes E are preferably tubular carbons closed at bottom and preferably rounded exteriorly at the lower ends, and containing a core I of metal or alloy fusible at or below the melting point of the lead chloride or other chloride to be decomposed, into which core a rod K from the terminal J plunges, so as to obtain good electrical contact without causing any bursting strain on the carbons by difference of expansion under heat. Such fusible core anodes form the subject of another application for Letters Patent of even date herewith, Serial No. 479,363, and, although I prefer to use them, my present invention is by no means limited in this respect as any other suitable carbons may be used for anodes.

The operation is as follows:—The pan A being initially filled to a sufficient height with molten lead, the bell B is secured in position. Lead chloride either in crystals or in the fused state is fed in through the pipe F until the exterior column of lead reaches the normal height, and, the space around the bell at the upper part having been packed with sand, the electrolytic decomposition is proceeded with, the normal level of the fused chloride and molten lead being maintained by feeding in more chloride at F as fast as the lead runs off at D.

Having now particularly described and ascertained the nature of the said invention and in what manner the same is to be performed, I declare that what I claim is—

1. In the process of electrolytically decomposing fused metallic chlorides, the method which consists in inclosing the metallic chloride, and effecting the electrolytic decomposition thereof wholly within a bell chamber whose mouth is sealed by dipping into molten metal corresponding to the base of the chloride treated and resulting in part from the decomposition of the said chloride, substantially as specified.

2. In the process of electrolytically decomposing fused metallic chlorides wholly within a bell chamber, the method which consists in sealing the mouth of the bell chamber against the escape of chlorine while permitting the reduced metal to run off as fast as it is produced, by causing the mouth of the vessel to dip into a bath of molten metal corresponding to the base of the chloride treated and resulting, in part, from the decomposition of the chloride, as specified.

Dated this 16th day of June, 1893.

FARNHAM MAXWELL LYTE.

Witnesses:
 T. W. KENNARD,
*Clerk to A. M. & Wm. Clark, Patent Agents,*
 *53 Chancery Lane, London.*
 G. F. WARREN,
*Notary Public, 17 Gracechurch Street, London.*